(12) United States Patent
Donadille et al.

(10) Patent No.: US 10,324,220 B2
(45) Date of Patent: Jun. 18, 2019

(54) METHOD FOR ESTIMATING RESERVOIR FLUID CHARACTERISTICS IN LAMINATED MEDIA

(71) Applicant: Schlumberger Technology Corporation, Sugar Land, TX (US)

(72) Inventors: Jean-Marc Donadille, Clamart (FR); Ollivier Faivre, Clamart (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 280 days.

(21) Appl. No.: 15/293,652

(22) Filed: Oct. 14, 2016

(65) Prior Publication Data

US 2017/0123095 A1 May 4, 2017

(30) Foreign Application Priority Data

Oct. 30, 2015 (EP) .................................... 15290281

(51) Int. Cl.
*G01V 3/28* (2006.01)
*G01V 3/38* (2006.01)
*E21B 47/12* (2012.01)

(52) U.S. Cl.
CPC .............. *G01V 3/28* (2013.01); *E21B 47/122* (2013.01); *G01V 3/38* (2013.01)

(58) Field of Classification Search
CPC .. G01V 3/28; G01V 3/38; E21B 47/00; E21B 47/122
USPC .......................................................... 702/5–7
See application file for complete search history.

(56) References Cited

U.S. PATENT DOCUMENTS

| 8,113,042 B2 * | 2/2012 | Donadille | E21B 43/16 73/152.05 |
| 8,485,027 B2 * | 7/2013 | Payton | G01V 7/04 702/6 |
| 2016/0061987 A1 * | 3/2016 | Kherroubi | G01V 3/18 702/7 |

OTHER PUBLICATIONS

Barber et al. Determining Formation Resistivity Anisotropy in the Presence of Invasion, SPE 90526, SPE Annual Technical Conference and Exhibition held in Houston, Texas, U.S.A., Sep. 26-29, 2004 (25 pages).

* cited by examiner

*Primary Examiner* — An H Do
(74) *Attorney, Agent, or Firm* — Michael Dae (57) ABSTRACT

Techniques involve obtaining dielectric measurements measured from a dielectric logging tool investigating a borehole at a one or more frequencies in a first frequency range, obtaining inductive measurements measured from an inductive tool investigating the borehole at one or more frequencies in a second frequency range, where the second frequency range is higher than the first frequency range, estimating an estimated resistivity anisotropy by conducting an inversion on the dielectric measurements, computing a measured resistivity anisotropy by conducting an inversion on the inductive measurements, and determining a characteristic related to reservoir fluids in the borehole, based on a comparison of the estimated resistivity anisotropy and the measured resistivity anisotropy.

19 Claims, 5 Drawing Sheets

FIG. 4  Oil sand, but not moveable $$\left(\frac{R_v}{R_h}\right)_{DS} = \left(\frac{R_v}{R_h}\right)_{RtS} \text{ (quite high)}$$

FIG. 5

Moveable oil in the sand in WBM $$\left(\frac{R_v}{R_h}\right)_{DS} < \left(\frac{R_v}{R_h}\right)_{RtS}$$

FIG. 6

Moveable water in the sand in OBM $$\left(\frac{R_v}{R_h}\right)_{DS} > \left(\frac{R_v}{R_h}\right)_{RtS} \quad \text{(quite high)}$$

FIG. 7

METHOD FOR ESTIMATING RESERVOIR FLUID CHARACTERISTICS IN LAMINATED MEDIA

CROSS-REFERENCE TO RELATED APPLICATIONS

The present invention claims the benefits of European Patent Application No. 15290281.3, filed on Oct. 30, 2015, titled "Method for estimating Reservoir Fluid Characteristics in Laminated Media," the entire content of which is hereby incorporated by reference into the current application.

BACKGROUND

The present invention relates to techniques for performing wellbore operations. More particularly, the present invention relates to techniques for determining characteristics of subterranean formations.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions.

Oil rigs are positioned at wellsites for performing a variety of oilfield operations, such as drilling a wellbore, performing downhole testing, and/or producing located hydrocarbons. To produce hydrocarbons economically, an accurate evaluation of reservoir fluid characteristics (e.g., reservoir fluid movability, hydrocarbon volume, etc.) may be performed. Accurately evaluating reservoir fluid characteristics is important in laminated formations. Due to laminated formations having regions or relatively high conductivity, evaluating reservoir fluid characteristics has conventionally been performed with tri-axial induction measurements providing an estimation of resistivity anisotropy. However, some induction tools obtain measurements in a limited depth range.

SUMMARY

A summary of certain embodiments disclosed herein is set forth below. It should be understood that these aspects are presented merely to provide the reader with a brief summary of these certain embodiments and that these embodiments are not intended to limit the scope of the systems and methods described herein. Indeed, embodiments of systems and methods described herein may encompass a variety of aspects that may not be set forth below.

Embodiments described herein relate to systems, methods, and computer-readable media for determining reservoir fluid characteristics based on multi-frequency dielectric measurements. According to some embodiments, a method is provided that includes obtaining dielectric measurements measured from a dielectric logging tool investigating a borehole at a one or more frequencies in a first frequency range, obtaining inductive measurements measured from an inductive tool investigating the borehole at one or more frequencies in a second frequency range, where the second frequency range is higher than the first frequency range, estimating an estimated resistivity anisotropy by conducting an inversion on the dielectric measurements, computing a measured resistivity anisotropy by conducting an inversion on the inductive measurements, and determining a characteristic related to reservoir fluids in the borehole, based on a comparison of the estimated resistivity anisotropy and the measured resistivity anisotropy.

Moreover, in some embodiments, a non-transitory computer-readable medium storing computer-executable instructions is provided. When executed by at least one processor, the instructions cause the at least one processor to perform the following: inputting dielectric measurements into a workflow for estimating resistivity anisotropy, wherein the dielectric measurements are measured by a dielectric tool deployed in a borehole comprising reservoir fluids; deriving horizontal and vertical components of conductivity of the borehole and relative permittivity of the borehole based on the dielectric measurements; inputting the horizontal and vertical components of conductivity of the borehole and relative permittivity of the borehole into an anisotropic dielectric forward model to determine an estimated resistivity anisotropy, wherein the estimated resistivity anisotropy comprises resistivity anisotropy estimated at approximately zero frequency.

In some embodiments, the computer-executable instructions further cause the at least one processor to compare the estimated resistivity anisotropy with a measured resistivity anisotropy, wherein the measured resistivity anisotropy comprises measurements from a downhole tool operating at near-zero frequencies. Further, in some embodiments, the computer-executable instructions further cause the at least one processor to determine a characteristic of the reservoir fluids, based on the comparison of the estimated resistivity anisotropy with the measured resistivity anisotropy.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Additionally, depending on the context, singular and plural terminology may be used interchangeably.

DETAILED DESCRIPTION

One or more specific embodiments of the present disclosure will be described below. These described embodiments are just examples of the presently disclosed techniques. Additionally, in an effort to provide a concise description of these embodiments, features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would still be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present techniques relate to techniques for determining resistivity anisotropy using dielectric measurements and using the estimated resistivity anisotropy measurements to estimate characteristics of the reservoir fluids. In some embodiments, the resistivity anisotropy measurements estimated from dielectric measurements may be evaluated with resistivity anisotropy measurements obtained from induction measurements to obtain a fuller range or reservoir fluid analysis than evaluating resistivity anisotropy measurements obtained from only induction measurements.

One or more embodiments of the present techniques relate to a workflow for computing resistivity anisotropy from dielectric logging tool measurements. The workflow may involve using an anisotropic petrophysical dielectric model for reconstructing the anisotropic dielectric dispersion at low frequencies to estimate the resistivity anisotropy. This resistivity anisotropy estimated from dielectric measurements, referred to as the estimated resistivity anisotropy, may be evaluated and compared with resistivity anisotropy measured at or close to DC frequency. For example, resistivity anisotropy measured at or close to DC frequency may be measured by a suitable induction tool measuring at induction frequency (e.g., 0 to about 500 kHz, and in some embodiments, less than approximately 200 kHz). This resistivity anisotropy measured at approximately DC frequencies, may be referred to as measured resistivity anisotropy. In some embodiments, because the estimated resistivity anisotropy is estimated from dielectric measurements obtained by a dielectric tool having a relatively shorter depth of investigation (DOI), and the measured resistivity anisotropy is measured by an induction tool having a relatively longer DOI, the combined estimated resistivity anisotropy and measured resistivity anisotropy may result in estimations of reservoir fluid characteristics over a fuller range of DOI than estimations based on one set of resistivity anisotropy data alone.

Resistivity anisotropy measurements are typically used to evaluate hydrocarbon presence in laminated media. For example, if hydrocarbon is present in the sand, then the resistivity of the sand laminations may be relatively high. The contrast with shale laminations, which have relatively low resistivity, may create macroscopic resistivity anisotropy. Some embodiments involve estimating DC resistivity from dielectric logging tool. Some dielectric logging tools may operate at discrete frequencies in the high frequency range (e.g., between approximately 20 MHz and 1 GHs) and may have longitudinal and transverse antenna polarizations which make it sensitive to both horizontal and vertical components of electromagnetic properties such as conductivity $\sigma$ and relative permittivity $\varepsilon$.

Deriving Horizontal and Vertical Components of Conductivity and Permittivity

Figure 1:
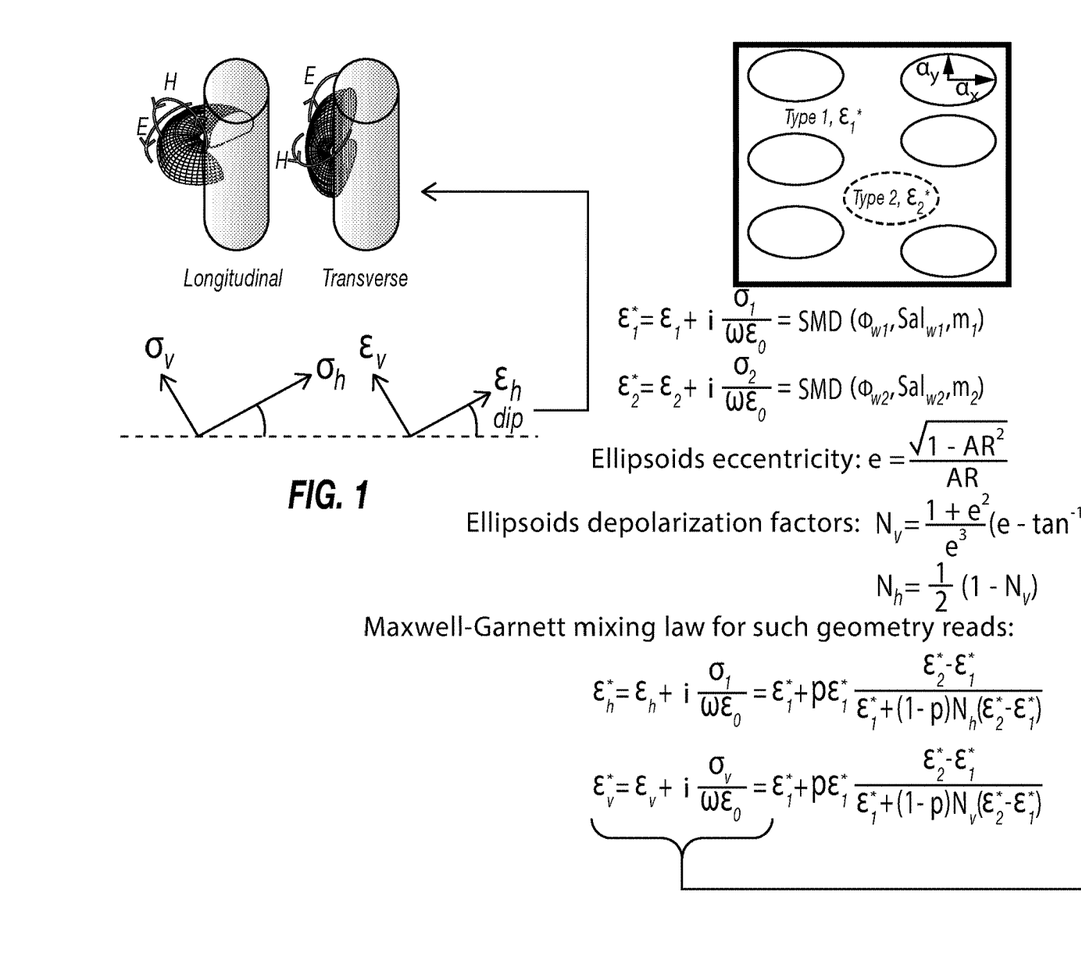
FIG. 1 is a schematic representing the prediction of horizontal and vertical permittivity and conductivity from inversion of raw dielectric data in accordance with one or more example embodiments.

In one or more embodiments, the workflow may involve deriving the horizontal and vertical components of relative permittivity $\varepsilon$ and conductivity $\sigma$ at the tool frequencies of operation, starting from the tool raw data. For example, if using a homogeneous anisotropic electromagnetic forward model that relates the tool data to $(\varepsilon_h, \sigma_h)$, $(\varepsilon_v, \sigma_v)$, and eventually the relative dip between the tool and the formation axes, then the inversion of this forward model yields the horizontal and vertical components of $\varepsilon$ and $\sigma$ at the tool frequencies of operation, as represented in FIG. 1.

Predicting Anisotropic Dielectric Dispersion

The workflow then involves evaluating the DC (e.g., approximately at zero frequency) resistivity anisotropy ratio $Rv/Rh=\sigma h/\sigma v$. Due to dielectric dispersion effects, both permittivity and conductivity are frequency-dependent, a fortiori the conductivity ratio. In some embodiments, this step may be model-based, involving first principles. The workflow involves an anisotropic dielectric forward model, which predicts the horizontal and vertical permittivity and conductivity dispersions, given some key petrophysical parameters. For example, a suitable forward model for predicting anisotropic dielectric dispersion is provided in the schematic of FIG. 2.

Anisotropy may be created by building a composite medium made of the features labeled Type 2 (from FIG. 2) embedded in the host labeled Type 1, under the form of ellipsoids that are all aligned along approximately the same direction. The volumetric proportion p of the ellipsoids in the medium and the aspect ratio AR common to all the ellipsoids characterize the medium. Each phase may also be characterized in terms of key petrophysical parameters, such as water filled porosity $\phi_w$, water salinity $Sal_w$, and rock cementation factor m.

Figure 2:
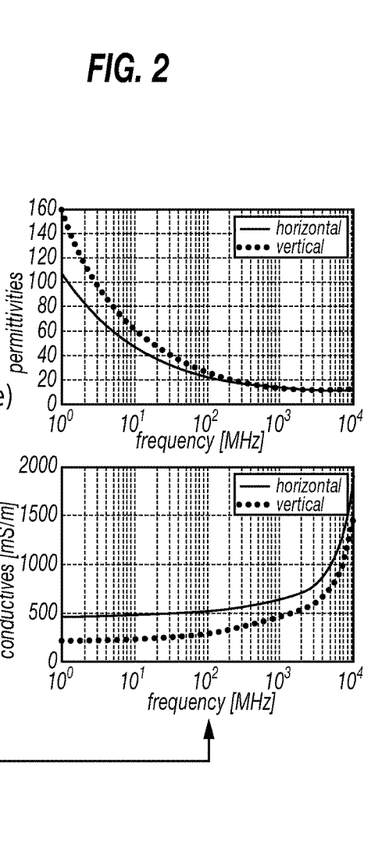
FIG. 2 is a schematic representing a workflow for predicting anisotropic dielectric dispersion in a forward model in accordance with one or more example embodiments.

In some embodiments, the complex permittivity of each phase can be predicted using any suitable dielectric dispersion law (e.g. Bimodal, SMD). The complex permittivity may include both the frequency-dependent permittivity and conductivity of each phase. The forward model of FIG. 2 provides an example using a SMD dielectric dispersion law.

Furthermore, an electromagnetic mixing procedure may be used for creating the composite medium dispersion. In the model of FIG. 2, the Maxwell-Garnett procedure has been used as an example. Due to the geometry of the medium the predicted dispersion curves for permittivity and conductivity are anisotropic, i.e. they are made of a horizontal and a vertical component.

Figure 3:
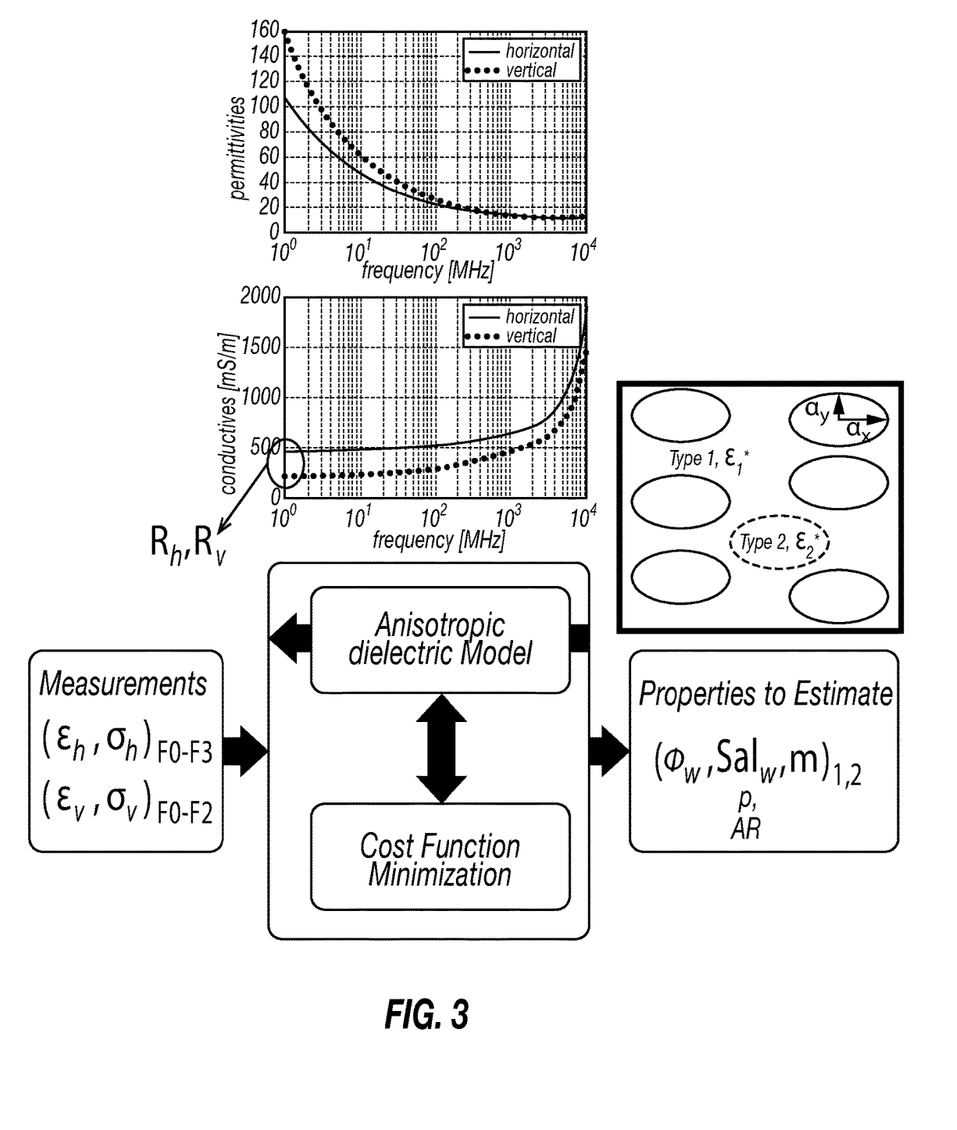
FIG. 3 is a representation of a workflow inverting the anisotropic dielectric model and reconstructing data to provide a resistivity anisotropy ratio in accordance with one or more example embodiments.

In some embodiments, predicting anisotropic dielectric dispersion uses an inversion procedure, as represented by the schematic of FIG. 3. The horizontal and vertical components of ε and σ at the tool frequencies of operation may be used as inputs in this inversion. During the inversion this 'measured' data is iteratively compared to the data predicted using the anisotropic dielectric model in FIG. 2. Once convergence has been reached, the inversion provides the eight properties: $(\phi_w, Sal_w, m)_1$, $(\phi_w, Sal_w, m)_2$, p, AR.

Inversion of the Anisotropic Dielectric Model and Reconstruction for the Resistivity Anisotropy Ratio The anisotropic dielectric forward model may also allow for reconstructing the input data. Taking the low-frequency limit of the reconstructed conductivity dispersion curves provides the reconstructed inverses of the DC Rh and Rv, and therefore the DC resistivity ratio. This may be similar to reconstructing a flushed zone resistivity Rxo from the Dielectric Scanner, except that the introduction of the anisotropic petrophysical dielectric model allows reconstructing Rh and Rv.

As discussed, the estimated resistivity anisotropy may then be evaluated and compared with resistivity anisotropy measured at or close to DC frequency. Because the estimated resistivity anisotropy is estimated from dielectric measurements obtained by a dielectric tool having a different DOI compared with an induction tool typically used for measuring resistivity anisotropy, the combined estimated resistivity anisotropy and measured resistivity anisotropy may result in estimations of reservoir fluid characteristics over a fuller range of DOI than estimations based on one set of resistivity anisotropy data alone.

Figure 4:
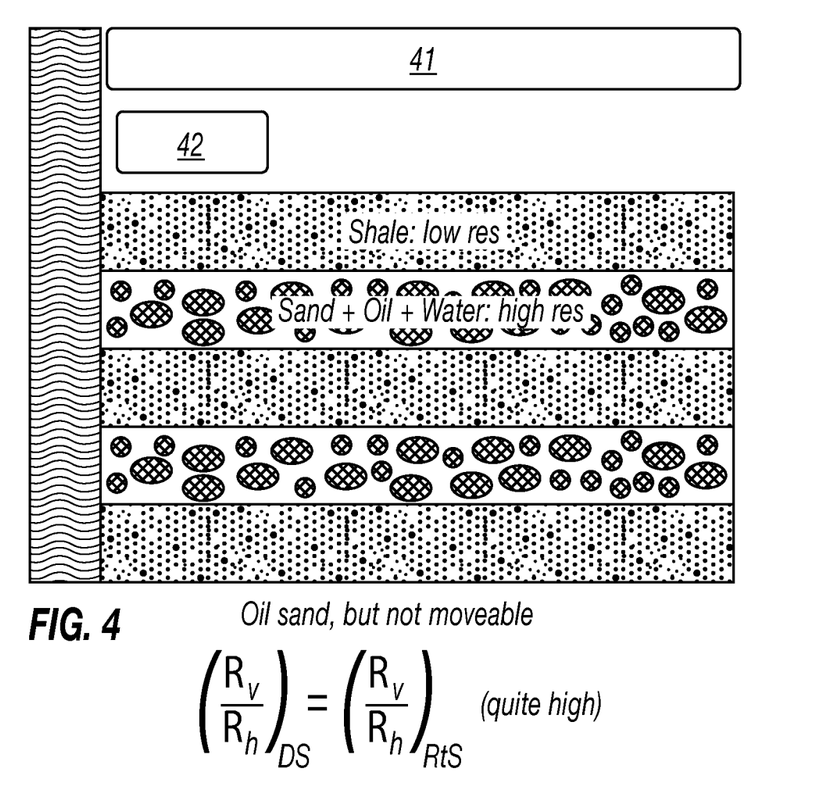
FIG. 4 is a schematic representation of shale-sand laminations where sand fluids are not movable in accordance with one or more example embodiments.

For example, FIG. 4 is a cross-sectional schematic representing fine shale-sand laminations which may be finer than the vertical resolution of most tools (e.g., either dielectric or inductive) used for making dielectric or resistivity measurements. The fine shale laminations may create resistivity anisotropy due to the resistivity difference between the conductive shale and the partially oil-filled sands that are more resistive. In other environments, such anisotropy can also be created in pure sand due to grain sorting. At the top of FIG. 4, the difference of DOI between an induction measurement 41 (typically having a DOI on the scale of a few tens of inches) and a dielectric measurement 42 (typically having a DOI of approximately less than 5 inches). This schematic may in particular represent a well drilled with water-based mud (WBM).

If the sand laminations are not invaded as represented in FIG. 4, then both tools may return the same relatively high anisotropy. In such situations, the shale laminations typically are not invaded. In WBM as represented by FIG. 4, there is potentially another case that leads to the same observation where both tools return the same relatively high anisotropy, which is when the WBM filtrate displaces the formation water only, and not the oil phase. If the filtrate and the formation water have comparable salinity, then this situation creates virtually no change in the resistivity of the sand layers close to the borehole, therefore does not change the macroscopic anisotropy level. The commonality between situations where shale laminations are not invaded or where WBM displaces formation water only, is that the oil phase is not movable. Therefore in WBM environments, the comparable value of resistivity anisotropy obtained from the two tools can be associated with hydrocarbon that is not movable.

In another situation where a well is drilled with oil-based mud (OBM) rather than WBM, the OBM filtrate might still not invade the sand laminations. In such a case, the returns of either tool may still be similar to that represented in FIG. 4, where both tools return the same relatively high anisotropy. However, in OBM there is potentially another case that leads to the same observation where both tools return the same relatively high anisotropy: this is if the OBM filtrate displaces the formation oil phase only, and not the water phase. As situation D is essentially oil replacing oil, it does not create any change in the resistivity of the sand layers close to the borehole, therefore does not change the macroscopic anisotropy level. The commonality between situations in OBM where the OBM filtrate does not invade the sand laminations and where OBM filtrate replaces oil is that the water phase is not movable. Therefore in OBM case, comparable value of resistivity anisotropy obtained from the two tools can be associated with water that is not movable.

Other situations may affect the returns of dielectric estimated resistivity anisotropy and/or inductive measured resistivity anisotropy. For example, in FIG. 5, conductive WBM filtrate has completely flushed away the reservoir fluids in a shallow radial zone of the permeable sand layers. This results in a decrease of the resistivity level in the sand layers close to the borehole, consequently decreasing the anisotropy returned by the shallow dielectric tool. When this invasion is less than 10 in deep, it is too shallow to have any impact on returns from the induction tool which have a deep DOI. Therefore, while the dielectric tool may return a lower resistivity anisotropy, the induction may still return the same relatively high anisotropy as in the scenarios represented in FIG. 4.

In WBM there is potentially another case that leads to the same observation where the resistivity anisotropy returned by the dielectric tool is lower than the one returned by a multi-axial induction tool. This is if the WBM filtrate displaces the formation oil phase only, and not the water phase. As situation is essentially water replacing oil, it may lower the resistivity of the sand layers close to the borehole, therefore lowering the macroscopic anisotropy level in those regions. The commonality between situations where conductive WBM completed flushes away reservoir fluids in shallow radial zones of permeable sand layers and where WBM filtrate displaces formation oil phase only is that the oil phase is movable. Therefore in WBM scenarios, lower value of resistivity anisotropy obtained by dielectric compared to induction tool can be associated with movable oil.

Figure 6:
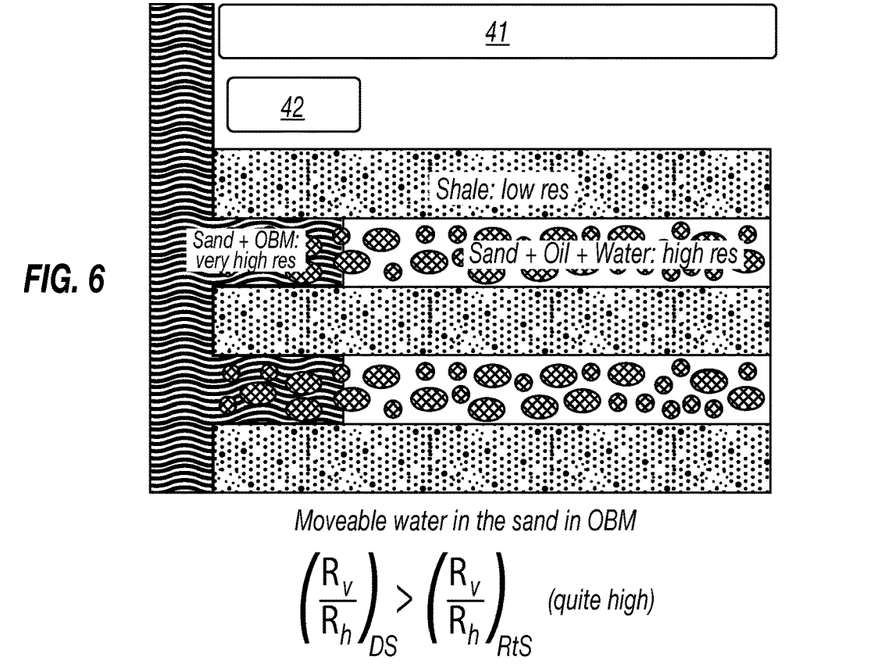
FIG. 6 is a schematic representation of shale-sand laminations with oil-based mud where sand fluids are not movable in accordance with one or more example embodiments.

A well drilled in OBM is provided in FIG. 6, where resistive OBM filtrate has completely flushed away the reservoir fluids in a shallow radial zone of the permeable sand layers. This results in an increase of the resistivity level in the sand layers close to the borehole, consequently increasing the anisotropy returned by the shallow dielectric tool. When this invasion is less than 10 in deep, it is too shallow to have any impact on the deep induction tool, therefore the induction still returns a relatively high anisotropy as in all the previous cases. In OBM there is potentially another scenario that leads to the same observation where the resistivity anisotropy returned by the dielectric tool is higher than the one returned by a multi-axial induction tool. This is if the OBM filtrate displaces the formation water phase only, and not the oil phase. As situation H is essentially oil replacing water, it typically would not increase the resistivity of the sand layers close to the borehole, therefore it increases the macroscopic anisotropy level in that region. The commonality between situations where OBM filtrate has completely flushed away the reservoir fluids in a shallow radial zone of permeable sand layers and where OBM displaces formation water phase only and not the oil phase is that the water phase is movable. Therefore in OBM case, higher value of resistivity anisotropy obtained by dielectric compared to induction tool can be associated with movable water.

In some cases anisotropy is created even when no hydrocarbon is present in the system. A typical example is the one of fine laminations with alternating low and high porosity, all filled with water only (such as fine cemented streaks that reduces the native porosity). In this case it is not the fluid type but the porosity difference that creates the resistivity difference between the beds, and therefore the macroscopic resistivity anisotropy. If such a system is invaded with WBM (and the mud salinity is not far from the connate water salinity), then no change is brought, and the anisotropy does not change: the two tools still return the same anisotropy. Therefore in WBM, the same anisotropy seen by the two tools can be due to situations as where sand laminations are not invaded or where WBM filtrate displaces formation water only (and oil phase is not movable), or that no hydrocarbon is present.

Figure 5:
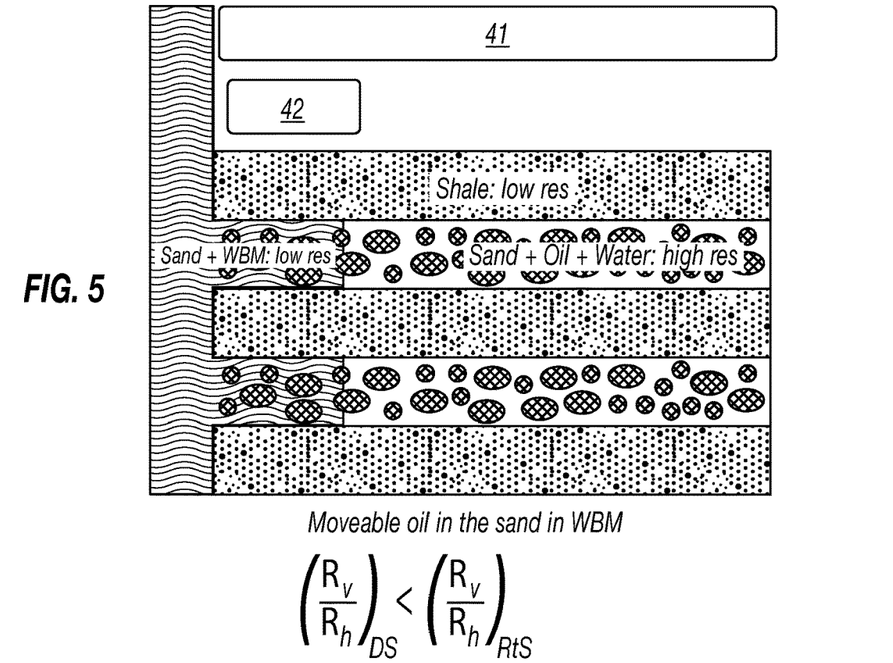
FIG. 5 is a schematic representation of shale-sand laminations with water-based mud where sand fluids are movable in accordance with one or more example embodiments.
Figure 7:
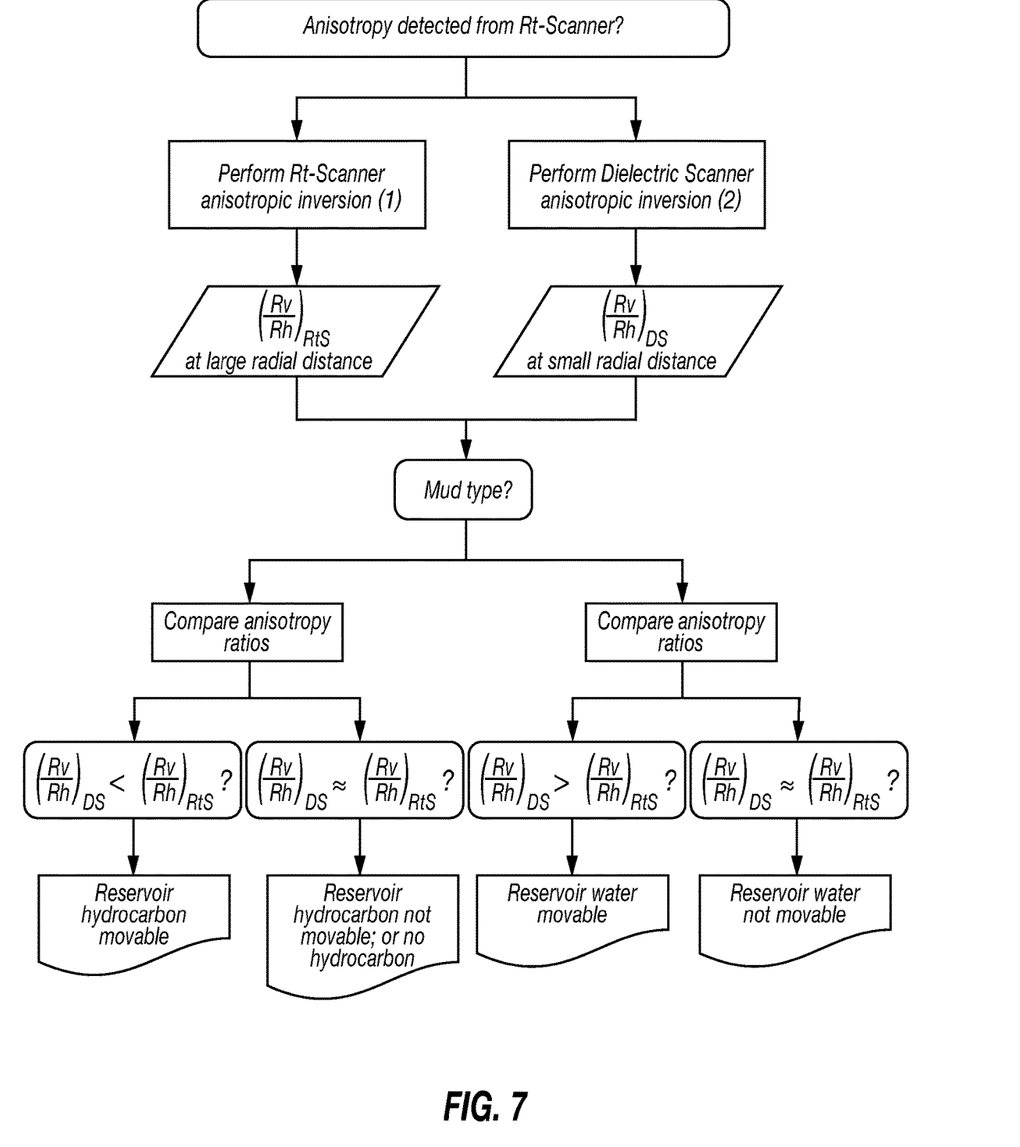
FIG. 7 is a workflow for characterizing reservoir fluid movability based on a comparison of dielectric measurements and inductive measurements in accordance with one or more example embodiments.

As explained in the discussion of various scenarios and as represented in FIGS. 4-6, the resistivity anisotropy measurements returned by dielectric tools may provide additional information in certain scenarios, compared to information provided by only inductive measurements, at least due to the different DOI of each tool. The workflow presented in the flow chart of FIG. 7 represents one or more embodiments of predicting the movability of fluids (water or oil) in a laminated reservoir using a comparison of estimated resistivity anisotropy (e.g., estimated DC resistivity ratio from a dielectric tool) and measured resistivity anisotropy (e.g., measured resistivity anisotropy from an inductive tool at or close to DC frequencies). The workflow involves receiving anisotropy measurement from an inductive tool and performing an inversion for the resistivity ratio at a large radial distance. The workflow also involves receiving dielectric measurements from a dielectric tool and computing an estimate of the resistivity ratio at a small radial distance. The anisotropy ratios may be compared depending on the mud type (e.g., WBM or OBM). Based on the mud type and the comparisons, the workflow of FIG. 7 may determine whether the reservoir hydrocarbon is movable, whether the reservoir hydrocarbon is not movable or there is no significant hydrocarbon, whether the reservoir water is movable, and/or whether reservoir water is not movable. Therefore, with the combination of two types of measurements, the present techniques allow for the further estimation of the movability of reservoir hydrocarbons or water.

While the embodiments are described with reference to various implementations and exploitations, it will be understood that these embodiments are illustrative and that the scope of the inventive subject matter is not limited to them. Many variations, modifications, additions and improvements are possible.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:
1. A method comprising:
    obtaining dielectric measurements measured from a dielectric logging tool investigating a borehole at a one or more frequencies in a first frequency range;
    obtaining inductive measurements measured from an inductive tool investigating the borehole at one or more frequencies in a second frequency range, where the second frequency range is higher than the first frequency range;
    estimating an estimated resistivity anisotropy by conducting an inversion on the dielectric measurements;
    computing a measured resistivity anisotropy by conducting an inversion on the inductive measurements; and
    determining a characteristic related to reservoir fluids in the borehole, based on a comparison of the estimated resistivity anisotropy and the measured resistivity anisotropy, wherein determining a characteristic related to reservoir fluids comprises determining a movability of hydrocarbon, a movability of water, or both.
2. The method of claim 1, wherein the first frequency range is higher than approximately 20 MHz.
3. The method of claim 1, wherein second frequency range is lower than approximately 500 kHz.
4. The method of claim 3, wherein the second frequency range is close to zero frequency.
5. The method of claim 1, wherein estimating the estimated resistivity anisotropy comprises:
    deriving horizontal and vertical components of conductivity and relative permittivity from the dielectric measurements;
    inputting the horizontal and vertical components of conductivity and relative permittivity in an anisotropic dielectric forward model to output a water-filled porosity of the borehole, a water salinity of the borehole, a rock cementation factor of the formation, a volumetric proportion of ellipsoid medium in the borehole, and an aspect ratio of the ellipsoids, or combinations thereof; and
    reconstructing the horizontal and vertical components of conductivity and relative permittivity output the estimated resistivity anisotropy ratio.
6. The method of claim 1, wherein determining the characteristic related to reservoir fluids in the borehole is further based on a mud characteristic in the borehole.
7. The method of claim 6, wherein determining the characteristic related to reservoir fluids in the borehole comprises determining whether or not reservoir hydrocarbon is movable, if the borehole comprises water-based mud.
8. The method of claim 6, wherein determining the characteristic related to reservoir fluids in the borehole comprises determining whether or not reservoir water is movable, if the borehole comprises oil-based mud.
9. A non-transitory computer-readable medium storing computer-executable instructions, that when executed by at least one processor, causes the at least one processor to perform the following:
    inputting dielectric measurements into a workflow for estimating resistivity anisotropy, wherein the dielectric measurements are measured by a dielectric tool deployed in a borehole comprising reservoir fluids;
    deriving horizontal and vertical components of conductivity of the borehole and relative permittivity of the borehole based on the dielectric measurements; and
    inputting the horizontal and vertical components of conductivity of the borehole and relative permittivity of the borehole into an anisotropic dielectric forward model to determine an estimated resistivity anisotropy, wherein the estimated resistivity anisotropy comprises resistivity anisotropy estimated at approximately zero frequency.

10. The non-transitory computer-readable medium of claim 9, wherein the computer-executable instructions further cause the at least one processor to compare the estimated resistivity anisotropy with a measured resistivity anisotropy, wherein the measured resistivity anisotropy comprises measurements from a downhole tool operating at near-zero frequencies.

11. The non-transitory computer-readable medium of claim 10, wherein the computer-executable instructions further cause the at least one processor to determine a characteristic of the reservoir fluids, based on the comparison of the estimated resistivity anisotropy with the measured resistivity ani sotropy.

12. The non-transitory computer-readable medium of claim 11, wherein the computer-executable instructions further cause the at least one processor to determine whether hydrocarbon in the reservoir fluids is movable or whether the hydrocarbon is not movable.

13. The non-transitory computer-readable medium of claim 11, wherein the computer-executable instructions further cause the at least one processor to determine whether water in the reservoir fluids is movable or whether the water is not movable.

14. A method comprising:
receiving dielectric measurements by a dielectric tool deployed in a borehole comprising reservoir fluids;
deriving horizontal and vertical components of conductivity of the borehole and relative permittivity of the borehole based on the dielectric measurements; and
inputting the horizontal and vertical components of conductivity of the borehole and relative permittivity of the borehole into an anisotropic dielectric forward model to determine an estimated resistivity anisotropy, wherein the estimated resistivity anisotropy comprises resistivity anisotropy estimated at approximately zero frequency.

15. The method of claim 14, further comprising comparing the estimated resistivity anisotropy with a measured resistivity anisotropy.

16. The method of claim 15, wherein the measured resistivity anisotropy comprises measurements from a downhole tool operating at near-zero frequencies.

17. The method of claim 14, further comprising determining a characteristic of the reservoir fluids, based on the comparison of the estimated resistivity anisotropy with the measured resistivity ani sotropy.

18. The method of claim 17, further comprising determining whether hydrocarbon in the reservoir fluids is movable or whether the hydrocarbon is not movable.

19. The method of claim 18, further comprising determining whether water in the reservoir fluids is movable or whether the water is not movable.

* * * * *